(12) United States Patent
Russ et al.

(10) Patent No.: US 9,637,049 B2
(45) Date of Patent: May 2, 2017

(54) METHOD FOR GENERATING AN OPERATOR CONTROL MESSAGE WHEN AN OPERATOR CONTROL EVENT OCCURS

(75) Inventors: Detlef Russ, Ebersdorf (DE); Holger Wuerstlein, Zeil am Main (DE); Thorsten Fuchs, Hallstadt (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 368 days.

(21) Appl. No.: 13/996,985

(22) PCT Filed: Nov. 23, 2011

(86) PCT No.: PCT/EP2011/005896
§ 371 (c)(1),
(2), (4) Date: Sep. 6, 2013

(87) PCT Pub. No.: WO2012/084111
PCT Pub. Date: Jun. 28, 2012

(65) Prior Publication Data
US 2014/0324273 A1    Oct. 30, 2014

(30) Foreign Application Priority Data
Dec. 21, 2010 (DE) .......... 10 2010 055 297

(51) Int. Cl.
*E05F 15/73* (2015.01)
*E05F 15/76* (2015.01)
(Continued)

(52) U.S. Cl.
CPC .............. *B60Q 5/005* (2013.01); *B60R 25/00* (2013.01); *B60R 25/2036* (2013.01);
(Continued)

(58) Field of Classification Search
CPC .......... B60Q 5/005; E05F 15/76; E05F 15/77; E05F 15/73; B60R 25/10; B60R 25/2045;
(Continued)

(56) References Cited

U.S. PATENT DOCUMENTS

| 5,929,769 | A  | 7/1999 | Garnault |
| 6,437,683 | B1 | 8/2002 | Wolf et al. |

(Continued)

FOREIGN PATENT DOCUMENTS

| DE | 10233726 | 2/2004 |
| EP | 1659542  | 5/2006 |

(Continued)

OTHER PUBLICATIONS

Examination Report for Priority Document DE102010055297.6 corresponding to U.S. Appl. No. 13/966,985 mailed Jul. 15, 2011 (8 pages).

(Continued)

*Primary Examiner* — Mussa A Shaawat
*Assistant Examiner* — Abdhesh Jha
(74) *Attorney, Agent, or Firm* — Pauly, Devries Smith & Deffner, LLC (57) ABSTRACT

The invention relates to a method for detecting an operator control event using a sensor arrangement having at least one proximity sensor and a sensor controller, the operator control event being generated by a user of a vehicle. A first coarse evaluation of the sensor measured values for the occurrence of an operator control sign is carried out, that a predetermined number of the respective last sensor measured values of at least one sensor element are buffered, that the detection of an operator control sign triggers a fine evaluation of the sensor measured values for verifying the occurrence of an operator control event at a triggering time, and that the fine evaluation is based on the buffered sensor (Continued)

measured values and on the temporally subsequent sensor measured values, with the result that sensor measured values both before and after the triggering time are included in the fine evaluation.

18 Claims, 4 Drawing Sheets

(51) Int. Cl.
   *B60Q 5/00*    (2006.01)
   *B60R 25/00*   (2013.01)
   *B60R 25/20*   (2013.01)
   *B60R 25/24*   (2013.01)
   *E05F 15/00*   (2015.01)

(52) U.S. Cl.
   CPC ...... *B60R 25/2045* (2013.01); *B60R 25/2054* (2013.01); *B60R 25/24* (2013.01); *E05F 15/76* (2015.01); *E05F 15/00* (2013.01); *E05F 15/73* (2015.01); *E05Y 2400/852* (2013.01); *E05Y 2400/858* (2013.01); *E05Y 2400/86* (2013.01); *E05Y 2900/546* (2013.01)

(58) Field of Classification Search
   CPC .. B60R 25/2054; B60R 25/24; E05Y 2400/00
   USPC .......................................................... 701/29
   See application file for complete search history.

(56) References Cited

U.S. PATENT DOCUMENTS

| | | | |
|---|---|---|---|
| 6,504,332 B1 | 1/2003 | Lamm et al. | |
| 6,542,071 B1 | 4/2003 | Kanada et al. | |
| 6,686,669 B1 | 2/2004 | Knab et al. | |
| 7,446,645 B2 | 11/2008 | Steegmann et al. | |
| 8,284,022 B2 | 10/2012 | Kachouh | |
| 2006/0200345 A1 | 9/2006 | Kooiman | |
| 2007/0087898 A1 | 4/2007 | Anderson et al. | |
| 2007/0247275 A1* | 10/2007 | Steegmann | B60R 25/246 340/5.2 |
| 2008/0195273 A1 | 8/2008 | Matsuura et al. | |
| 2008/0238135 A1* | 10/2008 | Takeda et al. | 296/146.4 |
| 2011/0118946 A1 | 5/2011 | Reimann et al. | |
| 2011/0276234 A1 | 11/2011 | Van Gastel | |

FOREIGN PATENT DOCUMENTS

| | | |
|---|---|---|
| EP | 2098670 | 9/2009 |
| JP | 2007016412 | 1/2007 |
| JP | 2009127244 | 6/2009 |
| WO | 2007006514 | 1/2007 |
| WO | 2007148178 | 12/2007 |
| WO | 2010139439 | 12/2010 |

OTHER PUBLICATIONS

International Search Report and Written Opinion for PCT/EP2011/005896 corresponding to U.S. Appl. No. 13/966,985, mailed Mar. 21, 2012 (21 pages) with translation.

Preliminary Report on Patentability for PCT/EP2011/005896 corresponding to U.S. Appl. No. 13/966,985, mailed Jun. 25, 2013 (14 pages) with translation.

Bishop, Christopher M. "Pattern Recognition and Machine Learning," Springer, Berlin, 2006, ISBN 0-387-31073-8, 29 pages.

Search Report for German Patent Application No. 102010055297.6 related to U.S. Appl. No. 13/996,985, mailed Jul. 15, 2011 (6 pages).

Machine translation of EP 2098670, Weghaus et al., filed Mar. 4, 2008, published on Sep. 9, 2009, 16 pages.

* cited by examiner

METHOD FOR GENERATING AN OPERATOR CONTROL MESSAGE WHEN AN OPERATOR CONTROL EVENT OCCURS

CROSS-REFERENCE TO RELATED APPLICATIONS

This application is a national stage application under 35 U.S.C. 317 of International Patent Application Serial No. PCT/EP2011/005896, entitled "Verfahren zur Erzeugung einer Bedienmeldung beim Auftreten eines Dedienereignisses," filed Nov. 23, 2011, which claims priority from German Patent Application No. DE 10 2010 055 297.6, filed Dec. 21, 2010, the disclosures of which are incorporated herein by reference.

FIELD OF THE INVENTION

The invention relates to a method for generating an operator control message when an operator control event and to a closure element arrangement of a motor vehicle.

BACKGROUND

The electrical systems of modern motor vehicles are provided with a multiplicity of electrical loads, a substantial portion of which are used to implement convenience functions.

One of the above convenience functions can be associated with the automatic actuation of motorized tailgates of motor vehicles. In the case of the known convenience function (DE 20 2005 020 140 U1), provision is made for a user-side operator control event, here a user-side foot movement, to cause the motorized opening of the tailgate. For this purpose, the motor vehicle is provided with a corresponding sensor arrangement and a sensor controller associated with the sensor arrangement. The arrangement is such that the sensor controller generates an operator control message in the case of an operator control event. For this purpose, the sensor controller is used, in operator control event monitoring, to monitor the sensor measured values for the occurrence of a behavior of the sensor measured values which is characteristic of the operator control event to be detected.

The above known method for detecting an operator control event using sensors enables particularly convenient motorized actuation of the tailgate of a motor vehicle. The design of the sensor controller is decisive for the actuation reliability. Difficulties may arise if a disruptive situation causes a behavior of the sensor measured values which partly corresponds to the behavior of the sensor signals of the operator control event to be detected. This may result in an operator control event being deemed to be detected, even though only a disruptive situation is actually present. This is associated with a reduction in the operational reliability of the method in question.

SUMMARY

The invention is based on the problem of developing the known method in such a manner that the operational reliability is increased.

The above problem is solved by the features of the disclosed invention.

It is crucial that, in addition to the operator control event monitoring, disruptive situation monitoring is set up, in which the sensor controller is used to monitor the sensor measured values of at least one sensor element for the occurrence of a behavior of the sensor measured values which is characteristic of a disruptive situation. According to the proposal, not only operator control event monitoring but also disruptive situation monitoring are therefore carried out.

It is also crucial that the sensor controller is used to generate an operator control message only when an operator control event, and not a disruptive situation, is present according to the two monitoring operations, that is to say the operator control event monitoring and the disruptive situation monitoring. This precludes the detection of an operator control event ultimately being traced back only to a disruptive situation.

In a particularly preferred refinement, the method according to the proposal is used in connection with a closure element arrangement of a motor vehicle. For this purpose, a particularly preferred refinement provides for at least two sensor elements which are arranged on a rear paneling part of a motor vehicle to be monitored.

Further preferred refinements relate to operator control event monitoring in the manner of pattern recognition in which the sensor signals are monitored for the occurrence of a number of characteristic features. Powerful mechanisms which can be used in the present case are known for this purpose.

An embodiment proposes that an area temporally immediately before the respective monitoring time, in particular, is also taken into account in any case in the disruptive situation monitoring. This makes it possible to check whether or not a supposed operator control event fits the context of the preceding sensor measured values. This takes into account the fact that an actual operator control event is usually preceded by a series of zero measured values. "Zero measured value" is used to denote the measured value which results when the effective range of the respective sensor element is free of any elements which can be detected using sensors.

According to the proposal, a "disruptive indicator" variable is defined and is increased whenever a disruptive sign is detected at the respective monitoring time. If a disruptive sign is not detected, provision is preferably made for the disruptive indicator to be reduced in a predetermined manner. This corresponds to a simple integration function which can be used, inter alia, to ensure that the influence of "outliers" in the sensor measured values is only low.

Several embodiments relate to a series of preferred definitions for disruptive signs, a disruptive sign, in the simplest case, involving a sensor element, as the sole sensor element, providing sensor measured values which are different from a zero measured value or are below a predetermined threshold at the respective monitoring time. This is appropriate when, in the case of an actual operator control event, both sensor elements generally provide sensor measured values which are different from the zero measured value or are above the threshold.

According to a further teaching, a closure element arrangement of a motor vehicle having a motor-adjustable closure element is claimed, motorized adjustment of the closure element being able to be triggered by an above operator control message from the associated sensor controller. The operator control message is generated according to the explained method according to the proposal. Reference can be made to all explanations which relate to the method according to the proposal.

In one embodiment the invention provides for a method for generating an operator control message when an operator control event occurs, a sensor arrangement having at least one sensor element in the form of a proximity sensor, in particular, and a sensor controller for generating the operator control message when the operator control event is present being provided, the sensor controller being used, in operator control event monitoring, to monitor the sensor measured values of at least one sensor element, in particular cyclically, for the occurrence of a behavior of the sensor measured values which is characteristic of the operator control event, wherein the sensor controller is used, in disruptive situation monitoring, to monitor the sensor measured values of at least one sensor element, cyclically for the occurrence of a behavior of the sensor measured values which is characteristic of a disruptive situation, in that the sensor controller is used to generate an operator control message only when an operator control event, and not a disruptive situation, is present according to the two monitoring operations, and in that a "disruptive indicator" variable is increased, cyclically in the disruptive situation monitoring when a disruptive sign is detected at the respective monitoring time, and in that a disruptive situation is deemed to be detected in the sensor controller when a predetermined threshold value for the disruptive indicator is exceeded.

In an embodiment, the at least one sensor element and the sensor controller are associated with a closure element arrangement of a motor vehicle having a motor-adjustable closure element.

In an embodiment, the operator control event is defined as a foot movement of the user, and in that the sensor arrangement has at least two sensor elements which are in the form of proximity sensors, are arranged in or on a rear paneling part, in particular the rear bumper, of a motor vehicle In an embodiment, a number of characteristic features, the occurrence of which is monitored during the operator control event monitoring, are associated with the behavior of the sensor measured values of at least one sensor element which is characteristic of the operator control event.

In an embodiment, a to and fro movement of the user's foot is defined as the operator control event, and in that both sensor elements, in particular, generate a pulsed temporal profile of the sensor measured values—sensor pulse—at substantially the same time during the operator control event.

In an embodiment, a characteristic feature is defined as the width or height or edge steepness or curvature of parts of the sensor pulses or as a temporal offset between two sensor pulses of a sensor element.

In an embodiment, a characteristic feature is defined as a temporal offset between the sensor pulses of two sensor elements or as a predetermined correlation, in particular a cross-correlation, of the sensor signals of two sensor elements relative to one another.

In an embodiment, the disruptive situation monitoring and the operator control event monitoring take place at substantially the same time.

In an embodiment, an area immediately before the respective monitoring time, in particular, is also monitored in any case in the disruptive situation monitoring.

In an embodiment, the disruptive indicator is reduced, in particular cyclically, if a disruptive sign is not detected at the monitoring time.

In an embodiment, a disruptive sign involves the sensor measured values of at least one sensor element being different from a zero measured value and not corresponding to at least one characteristic feature at the monitoring time or in a time range associated with the monitoring time.

In an embodiment, a disruptive sign involves the degree of similarity of the signal profiles of two sensor elements undershooting a predetermined threshold value in a time range associated with the respective monitoring time.

In an embodiment, a disruptive sign involves a correlation value, in particular a cross-correlation value, between the sensor measured values of two sensor elements undershooting a predetermined threshold value.

In an embodiment, a disruptive sign involves a sensor element, as the sole sensor element, providing sensor measured values which are different from a zero measured value or are above a predetermined threshold value at the respective monitoring time.

In one embodiment the invention provides a closure element arrangement of a motor vehicle having a motor-adjustable closure element, a sensor arrangement having at least one sensor element in the form of a proximity sensor, in particular, and a sensor controller being provided for the purpose of generating an operator control message when an operator control event occurs, motorized adjustment of the closure element being able to be triggered by the operator control message, the sensor controller, in operator control event monitoring, monitoring the sensor measured values of at least one sensor element, in particular cyclically, for the occurrence of a behavior of the sensor measured values which is characteristic of the operator control event to be detected, in particular for carrying out a method as claimed in one of the preceding claims, wherein the sensor controller, in disruptive situation monitoring, monitors the sensor measured values of at least one sensor element, cyclically for the occurrence of a behavior of the sensor measured values which is characteristic of a disruptive situation, in that the sensor controller generates an operator control message only when an operator control event, and not a disruptive situation, is present according to the two monitoring operations, and in that the sensor controller, in the disruptive situation monitoring, increases a "disruptive indicator" variable, cyclically when a disruptive sign is detected at the respective monitoring time, and in that a disruptive situation is deemed to be detected in the sensor controller when a predetermined threshold value for the disruptive indicator is exceeded.

In one embodiment, the motor-adjustable closure element comprises a gate.

In one embodiment, the motor-adjustable closure element comprises a tailgate.

In one embodiment, the sensor elements are arranged in or on a rear paneling part and extend over a substantial part of the width of the motor vehicle, in that the detection range of one sensor element also points to the rear in any case, and in that the detection range of the other sensor element also points downward in any case.

BRIEF DESCRIPTION OF THE FIGURES

The invention is explained in more detail below using a drawing which illustrates only one exemplary embodiment and in which.

DETAILED DESCRIPTION

The method according to the proposal for generating an operator control message when an operator control event occurs is explained below using an operator control event which is produced by a user of a motor vehicle. However, the method according to the proposal can be used for all conceivable areas in which the detection of operator control events using sensors is involved.

According to the proposal, the operator control event is detected using sensors by means of a sensor arrangement 1 which is assigned a sensor element 2, 3, which is preferably in the form of a proximity sensor here, and a sensor controller 4. The exemplary embodiment illustrated here involves a sensor arrangement 1 having precisely two sensor elements 2, 3, as also explained below.

The sensor controller 4 is primarily used to generate an operator control message as soon as an actual operator control event is present. This operator control message is then used to trigger downstream processes, for example an authentication dialog or the control of a drive.

The generation of an operator control message is based on the results of operator control event monitoring during which the sensor controller 4 is used to monitor the sensor measured values 5, 6 of at least one sensor element 2, 3 for the occurrence of a behavior of the sensor measured values 5, 6 which is characteristic of the operator control event to be detected. The sensor controller 4 preferably operates cyclically, with the result that the above monitoring is carried out cyclically, in particular. The operator control event monitoring is carried out continuously here, that is to say constantly or, in any case, at particular cycle intervals over a monitoring period.

In this case, the operator control event to be detected is preferably a foot movement of the user of the motor vehicle, as is also explained.

Figure 2:
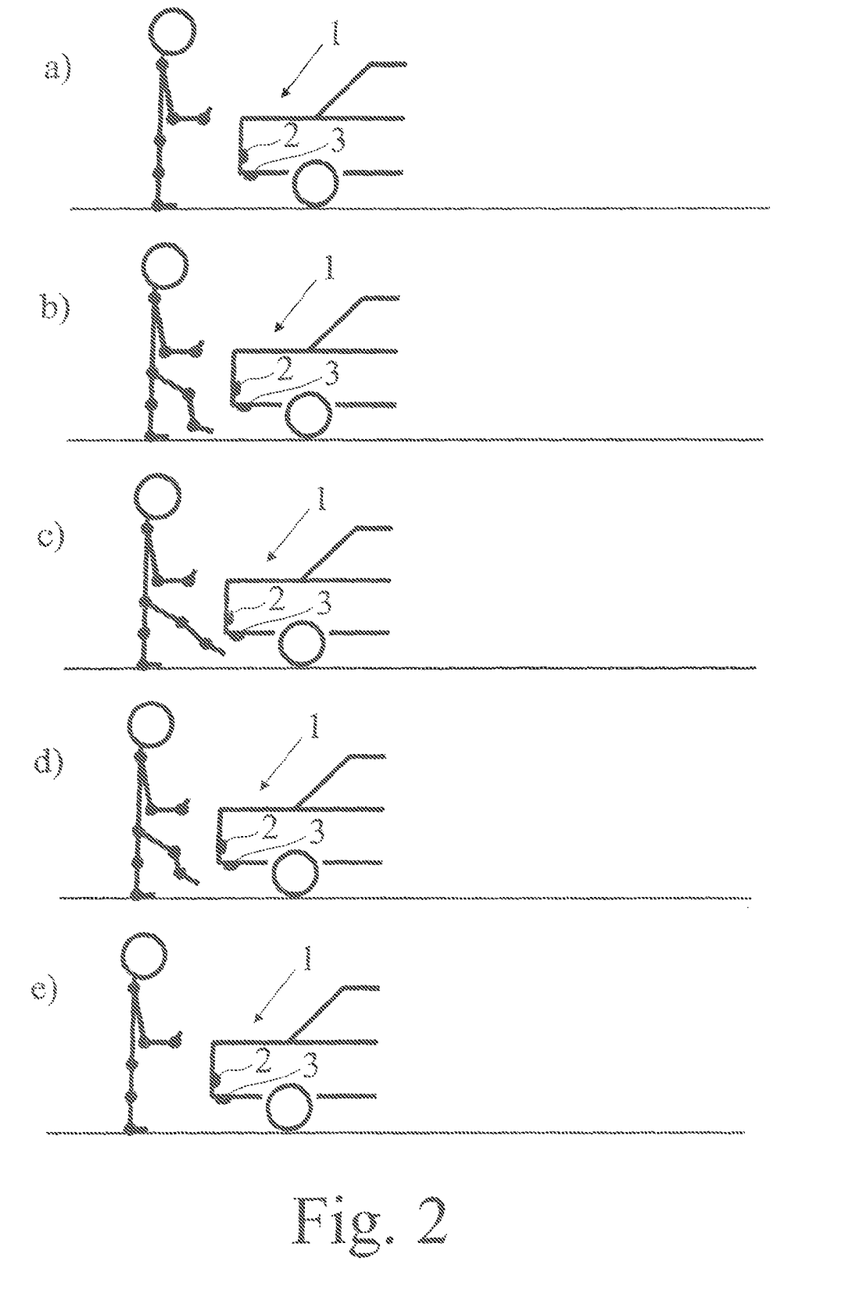
FIG. 2 shows a sequence of an operator control event according to the proposal to be detected in the five stages a) to e)
Figure 3:
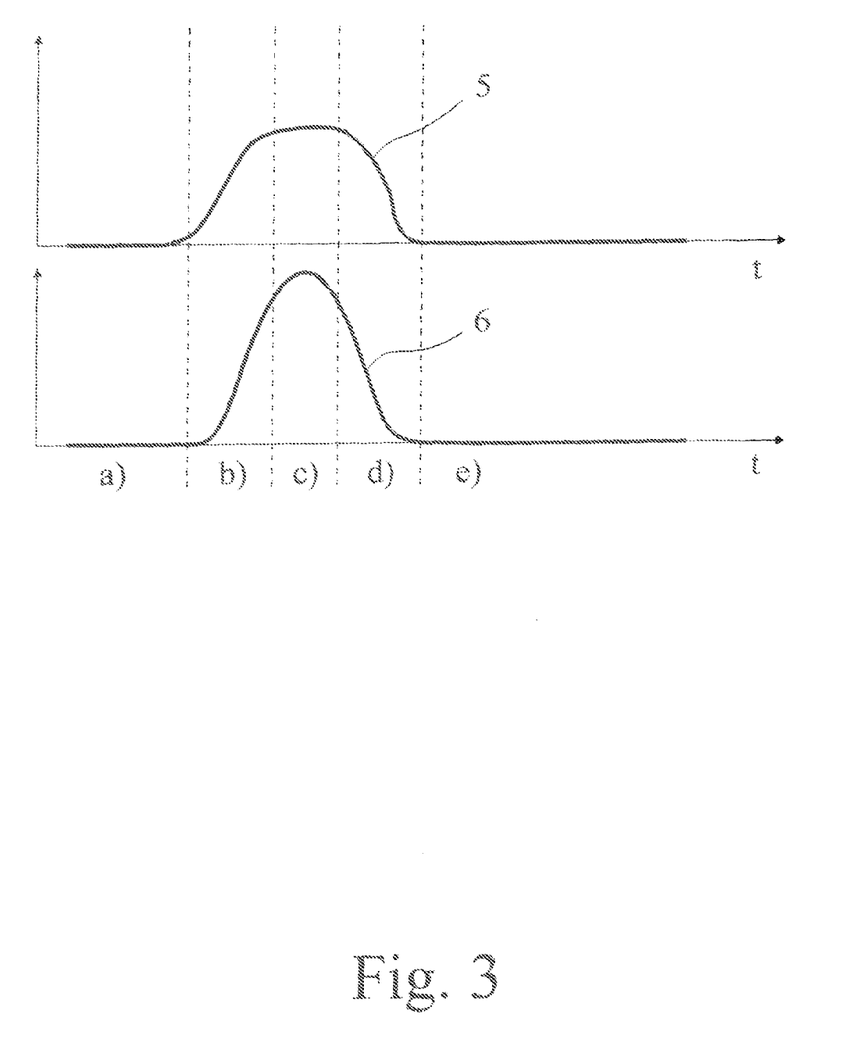
FIG. 3 shows two exemplary signal profiles of two sensor elements of the closure element arrangement according to FIG. 1 during an operator control event according to FIG. 2.

FIG. 2 shows, in images a) to e), the stages in the sequence of an operator control event which comprises a to and fro movement of the user's foot. FIG. 3 shows the resultant sensor measured values 5, 6 of the two sensor elements 2, 3, the stages a) to e) illustrated in FIG. 2 being accordingly indicated in the time range in the illustration there.

Figure 4:
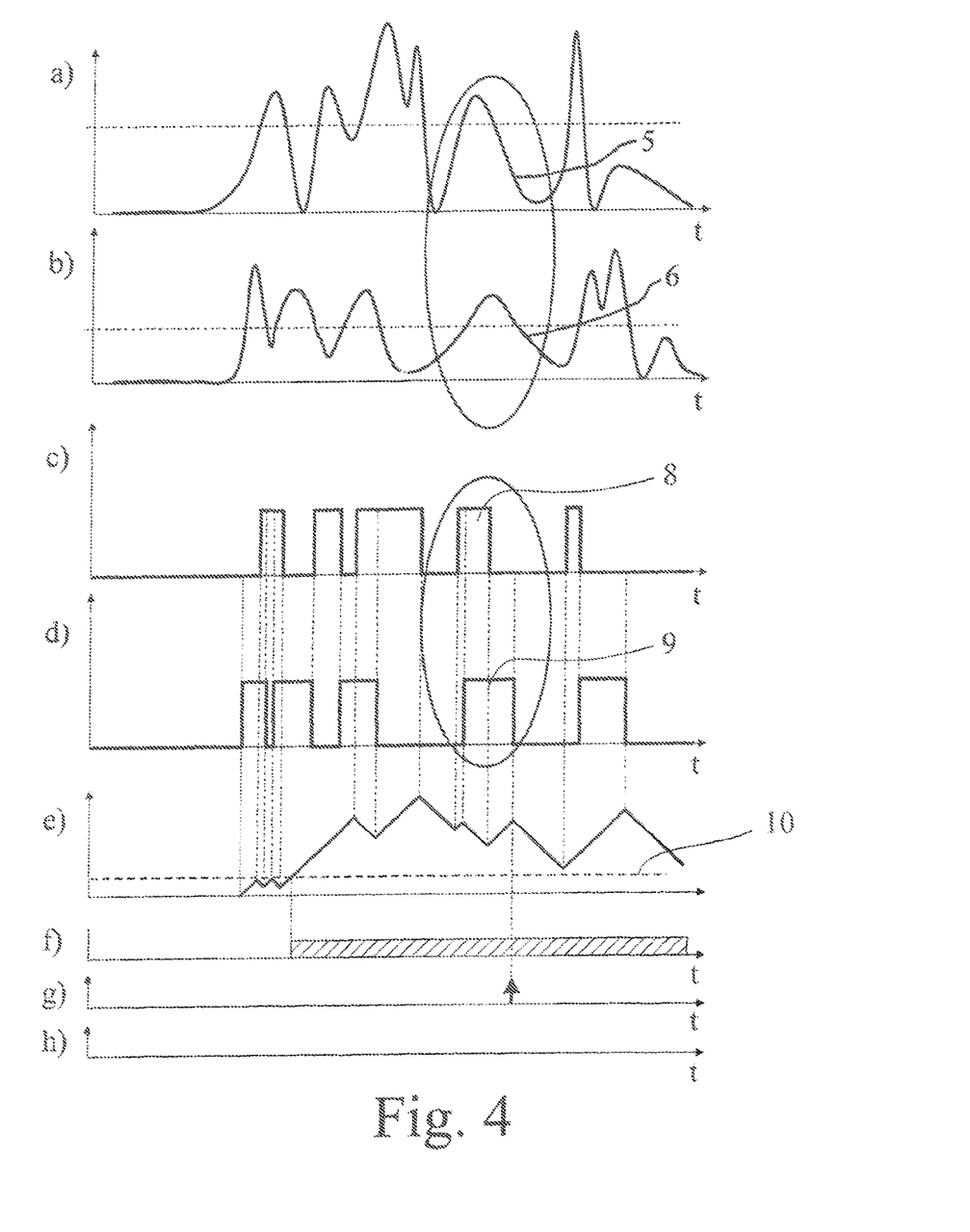
FIG. 4 shows, in a) and b), the sensor measured values of two sensor elements during a disruptive situation; in c) and d), the corresponding sensor measured values after threshold value filtering; in e), the "disruptive indicator" variable; in f), the "disruptive indicator" variable after threshold value filtering; in g), the result of the operator control event monitoring; and in h), the result of the generation of operator control messages.

FIGS. 4*a*) and 4*b*) now show a disruptive situation which may occur, for example, when passing through a car wash. As a result of the largely chaotic signal profiles, it is the case here that the behavior of the sensor measured values which is characteristic of the operator control event to be detected also occurs at a particular time. The corresponding areas of the signal measured values are each marked with a circle in figs a), b) and c), d). An operator control event is therefore deemed to be detected in the operator control event monitoring, which would result in undesirable actuation without further measures.

In order to avoid the above incorrect detection of an operator control event, the proposal provides for the sensor controller 4 to be used, in disruptive situation monitoring, to monitor the sensor measured values 5, 6 of at least one sensor element 2, 3, in particular cyclically, for the occurrence of a behavior of the sensor measured values 5, 6 which is characteristic of a disruptive situation. The disruptive situation monitoring is also carried out continuously here, that is to say constantly or, in any case, at particular cycle intervals over a monitoring period. A comparison of FIGS. 3 and 4 shows that the disruptive situation illustrated in FIG. 4 can be detected in a comparatively simple manner.

It is now crucial that the sensor controller 4 is used to generate an operator control message only when an operator control event, and not just a disruptive situation, is present according to the two monitoring operations, that is to say the operator control event monitoring and the disruptive situation monitoring. As explained above, this is based on the consideration that a disruptive situation can readily comprise a supposed operator control event.

It has already been pointed out that the at least one sensor element 2, 3 and the sensor controller 4 are associated with a closure element arrangement, here a tailgate arrangement, of a motor vehicle having a motor-adjustable closure element 7 and preferably a motor-adjustable gate 7, in particular a tailgate 7, motorized adjustment, here motorized opening, of the closure element 7, here the tailgate 7, being able to be triggered by the operator control message.

Figure 1:
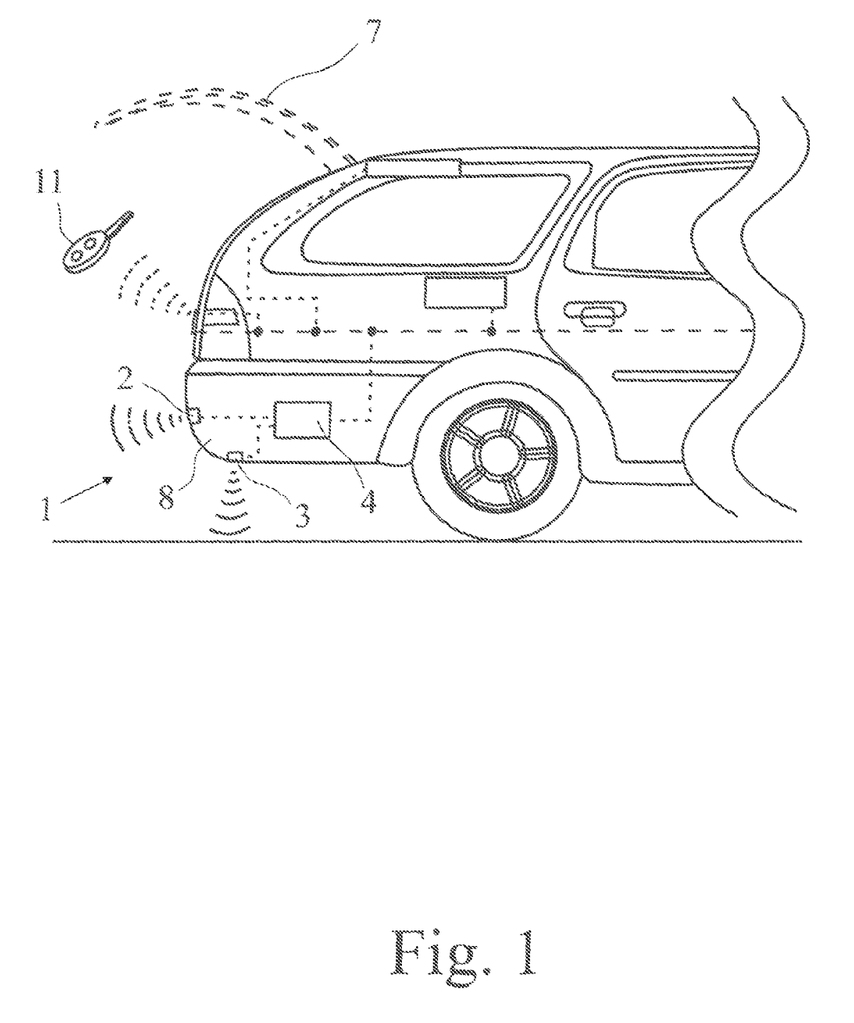
FIG. 1 shows the rear area of a motor vehicle having a closure element arrangement according to the proposal for carrying out the method according to the proposal.

As already mentioned, the operator control event to be detected is a foot movement of the user in the present case, the sensor arrangement 1 having at least two (in this case precisely two) sensor elements 2, 3 which are in the form of proximity sensors and, as illustrated in FIG. 1, are arranged in or on a rear paneling part 7*a*, preferably the rear bumper 7*a* here, of the motor vehicle. In this case, the two sensor elements 2, 3 are preferably capacitive proximity sensors with electrodes which each extend over a substantial part of the width of the motor vehicle. This ensures that it is accordingly possible to detect the operator control event over the substantial part of the width of the motor vehicle.

It can be gathered from the illustration according to FIG. 1 that the schematically illustrated detection range of the upper sensor element 2 also points to the rear in any case and that the detection range of the lower sensor element 3 also points downward in any case. This sensor arrangement 1 accordingly results in the sensor measured values 5, 6 illustrated in FIG. 3.

Experiments have shown that, although an operator control event, such as a foot movement of the user, always results in the qualitatively identical characteristic behavior of the sensor measured values 5, 6 of at least one sensor element 2, 3, the resultant sensor measured values 5, 6 vary in detail depending on the user. Fundamentally known pattern recognition methods can accordingly be used here.

As the basis for the pattern recognition, a series of characteristic features, the occurrence of which is monitored during operator control event monitoring, are associated with the behavior of the sensor measured values 5, 6 of at least one sensor element 2, 3 which is characteristic of the operator control event to be detected. During pattern recognition, these features are first of all extracted from the sensor measured values 5, 6 and are then classified.

This corresponds to the fundamental concept of pattern recognition. In this case, possibly pre-filtered measured values are first of all subjected to feature extraction. The features to be extracted should be selected in such a manner that they are "separation effective". This means that the features must be suitable for distinguishing the "with operator control event" state from the "without operator control event" state (Christopher M. Bishop, "Pattern Recognition and Machine Learning", Springer, Berlin, 2006, ISBN 0-387-31073-8).

The feature reduction is followed by the performance of classification in which the embodiment of the extracted features is associated with particular classes of patterns to be detected.

The literature discloses a series of so-called "classifiers" which can advantageously also be used in the present area. Merely by way of example, the classifiers "window", "Euclidean distance", "nearest neighbor", "family of characteristic curves", "fuzzy logic" and "neural networks" may be cited.

In detail, the operator control event to be detected is preferably a to and fro movement of the user's foot in this case, both sensor elements 2, 3, in particular, generating a pulsed temporal profile of the sensor measured values 5, 6, which is referred to as a "sensor pulse" below, substantially at the same time during the operator control event. The width, the height, the edge steepness, the curvature of parts of the sensor pulses, the temporal offset between two sensor pulses of a sensor element 2, 3 or the like may be defined as features to be extracted. These features are then checked for limit values or limit ranges during classification.

Further conceivable features here are the temporal offset between the sensor pulses of two sensor elements 2, 3 or a predetermined correlation, particularly the cross-correlation of the sensor signals 5, 6 of two sensor elements 2, 3 relative to one another. These features can also be classified using limit values and limit ranges such that, possibly together with the aforementioned features, it is possible to infer the occurrence or nonoccurrence of an operator control event.

In the present case, the fact that the disruptive situation monitoring and the operator control event monitoring take place at substantially the same time is interesting. In particular, provision may be made for both monitoring operations to access the same, possibly pre-filtered, sensor measured values 5, 6.

The illustration in FIG. 4 shows that the area before the respective monitoring time is also relevant to the determination of a disruptive situation, with the result that an area immediately before the respective monitoring time, in particular, is also monitored in the disruptive situation monitoring in a particularly preferred refinement.

A whole series of advantageous variants are conceivable for the disruptive situation monitoring. It is the case here that a "disruptive indicator" variable is increased, in particular cyclically, in the disruptive situation monitoring if a predefined disruptive sign is detected at the respective monitoring time, a disruptive situation being deemed to be detected in the sensor controller 4 if a predetermined threshold value for the disruptive indicator is exceeded. It could also be stated that the disruptive signs are added until the above threshold value has been exceeded.

If a disruptive sign is not detected at the respective monitoring time, provision is preferably made for the disruptive indicator to be reduced, in particular cyclically. A behavior which corresponds to integration of values for the respective disruptive signs finally results for the disruptive indicator.

A whole series of advantageous variants are conceivable for the definition of the disruptive sign(s). It is preferably the case that a disruptive sign is defined in such a manner that the sensor measured values 5, 6 of at least one sensor element 2, 3 are different from the zero measured value, but at least do not correspond to a feature characteristic of the operator control event, at the respective monitoring time or in a time range associated with the respective monitoring time. This means that at least one sensor element 2, 3 detects something in its sensor range but a feature characteristic of the operator control event is missing.

It is also conceivable for a disruptive sign to be deemed to be detected only when a predetermined minimum number of characteristic features are missing from the total number of features characteristic of the operator control event. In this case, provision may be made for the disruptive indicator to be increased by the numerical value "1" or by a value which depends on the number of characteristic features which have not been complied with.

In the case of the behavior of the sensor measured values 5, 6 which is characteristic of the operator control event and is illustrated in FIG. 3, it is apparent that the sensor measured values 5, 6 of the sensor elements 2, 3 are very similar to one another when there is no disruption. Accordingly, provision is advantageously made for a disruptive sign to involve the degree of similarity of the signal profiles of two sensor elements 2, 3 undershooting a predetermined threshold value in an area associated with the respective monitoring time.

In particular, the degree of the above similarity of the signal profiles can be defined using a correlation value, in particular using a cross-correlation value. Accordingly, a disruptive sign preferably involves a correlation value, in particular a cross-correlation value, between the sensor measured values 5, 6 of two sensor elements 2, 3 undershooting a predetermined threshold value.

It can also be gathered from the illustration in FIG. 3 that, in the case of the signal profile characteristic of the operator control event there, both sensor elements 2, 3 almost consistently each provide sensor measured values which are different from the zero measured value. Since this is generally different in a disruptive situation, a disruptive sign preferably involves a sensor element 2, 3, as the sole sensor element 2, 3, providing sensor measured values 5, 6 which are different from the zero measured value or are above a predetermined threshold value at the respective monitoring time (FIG. 4e)).

The method according to the proposal is explained below using the signal profile illustrated in FIG. 4.

In a first step, the two sensor measured values 5, 6 are filtered in a threshold value filter, with the result that the sensor measured values illustrated in FIGS. 4c) and 4d) are produced. The resultant square-wave pulses are examined for a whole series of characteristic features, as explained further above. In this case, the operator control event monitoring provides a hit since the square-wave pulses 8 and 9 of the two sensor elements 2, 3 imply the presence of an operator control event. The result of the operator control event monitoring is illustrated in FIG. 4g).

However, the illustration of the disruptive indicator according to FIG. 4e) and the associated illustration of the disruptive indicator after threshold value filtering according to FIG. 4f) show that the disruptive indicator has exceeded the predetermined threshold value 10 in the area of the supposed operator control event, which preferably means here that there is a disruptive situation. As a result of the fact that, according to the proposal, the sensor controller 4 is used to generate an operator control message only when an operator control event, and not a disruptive situation, is present according to the two monitoring operations, an operator control message is not generated in the case of the sensor profile illustrated in FIG. 4, as shown in FIG. 4h).

As a result, the disruptive situation monitoring forms an addition to the operator control event monitoring which, in principle, would be executable even without the disruptive situation monitoring. The detection of supposed (but not actually present) operator control events is effectively suppressed with simple means using the disruptive situation monitoring.

According to a further teaching which is likewise assigned independent importance, a closure element arrangement of a motor vehicle having a motor-adjustable closure element 7, here a motor-adjustable tailgate 7, is claimed, a sensor arrangement 1 having at least one sensor element 2, 3 in the form of a proximity sensor, in particular, and a sensor controller 4 being provided in order to generate an operator control message using sensors. The operator control message makes it possible to trigger motorized adjustment of the closure element 7. In this case, the motorized adjustment of the closure element 7 may be preceded by a series of queries, in particular an authentication dialog with a radio key 11. Such an authentication dialog is only indicated in FIG. 1 and does not play a role for the teaching according to the proposal.

In operator control event monitoring, the sensor controller 4 monitors the sensor measured values 5, 6 of at least one sensor element 2, 3 for the occurrence of a behavior of the sensor measured values 5, 6 which is characteristic of the operator control event to be detected.

It is now crucial that, in disruptive situation monitoring, the sensor controller 4 monitors the sensor measured values 5, 6 of at least one sensor element 2, 3 for the occurrence of a behavior of the sensor measured values 5, 6 which is characteristic of a disruptive situation, and that the sensor controller 4 generates an operator control message only when an operator control event, and not a disruptive situation, is present according to the two monitoring operations.

With regard to the explanation and possible variants of the further teaching according to the proposal, reference can be made to the above explanations of the method according to the proposal in the first teaching.

The invention claimed is:

1. A method for generating an operator control message when an operator control event occurs, a sensor arrangement having at least one sensor element in the form of a proximity sensor and a sensor controller for generating the operator control message when the operator control event is present being provided,
   the sensor controller being used, in operator control event monitoring, to monitor the sensor measured values of at least one sensor element, in particular cyclically, for the occurrence of a behavior of the sensor measured values which is characteristic of the operator control event,
   wherein the sensor controller is used, in disruptive situation monitoring, to monitor the sensor measured values of the at least one proximity sensor cyclically for the occurrence of a behavior of the sensor measured values which is characteristic of a disruptive situation,
   in that the sensor controller is used to generate an operator control message only when an operator control event, and not a disruptive situation, is present according to the two monitoring operations, and
   in that a "disruptive indicator" variable is increased cyclically in the disruptive situation monitoring when a disruptive sign is detected at a respective monitoring time, and in that a disruptive situation is deemed to be detected in the sensor controller when a predetermined threshold value for the disruptive indicator is exceeded.

2. The method as claimed in claim 1, wherein the at least one proximity sensor and the sensor controller are associated with a closure element arrangement of a motor vehicle having a motor-adjustable closure element.

3. The method as claimed in claim 1, wherein the operator control event is defined as a foot movement of the user, and wherein the sensor arrangement has at least two sensor elements which are in the form of proximity sensors, and are arranged in or on a rear paneling part of a motor vehicle.

4. The method as claimed in claim 1, wherein a number of characteristic features, the occurrence of which is monitored during the operator control event monitoring, are associated with the behavior of the sensor measured values of the at least one sensor element which is characteristic of the operator control event.

5. The method as claimed in claim 1, wherein a to and fro movement of the user's foot is defined as the operator control event, and wherein the at least one sensor element generates a pulsed temporal profile of the sensor measured values—sensor pulse—at substantially the same time during the operator control event.

6. The method as claimed in claim 4, wherein a characteristic feature is defined as the width or height or edge steepness or curvature of parts of the sensor pulses or as a temporal offset between two sensor pulses of a sensor element.

7. The method as claimed in claim 4, wherein a characteristic feature is defined as a temporal offset between the sensor pulses of two sensor elements or as a predetermined correlation of the sensor signals of two sensor elements relative to one another.

8. The method as claimed in claim 1, wherein the disruptive situation monitoring and the operator control event monitoring take place at substantially the same time.

9. The method as claimed in claim 1, wherein an area immediately before the respective monitoring time is also monitored in any case in the disruptive situation monitoring.

10. The method as claimed in claim 1, wherein the disruptive indicator is reduced if a disruptive sign is not detected at the monitoring time.

11. The method as claimed in claim 1, wherein a disruptive sign involves the sensor measured values of the at least one sensor element being different from a zero measured value and not corresponding to at least one characteristic feature at the monitoring time or in a time range associated with the monitoring time.

12. The method as claimed in claim 1, wherein a disruptive sign involves the degree of similarity of the signal profiles of two sensor elements undershooting a predetermined threshold value in a time range associated with the respective monitoring time.

13. The method as claimed in claim 1, wherein a disruptive sign involves a correlation value between the sensor measured values of two sensor elements undershooting a predetermined threshold value.

14. The method as claimed in claim 1, wherein a disruptive sign involves a sensor element, as the sole sensor element, providing sensor measured values which are different from a zero measured value or are above a predetermined threshold value at the respective monitoring time.

15. A closure element arrangement of a motor vehicle having a motor-adjustable closure element, a sensor arrangement having at least one sensor element in the form of a proximity sensor and a sensor controller being provided for the purpose of generating an operator control message when an operator control event occurs, motorized adjustment of the closure element being able to be triggered by the operator control message,
   the sensor controller, in operator control event monitoring, monitoring the sensor measured values of at least one sensor element for the occurrence of a behavior of the sensor measured values which is characteristic of the operator control event to be detected wherein the sensor controller, in disruptive situation monitoring, monitors the proximity sensor measured values of at least one sensor element, cyclically for the occurrence of a behavior of the sensor measured values which is characteristic of a disruptive situation, in that the sensor controller generates an operator control message only when an operator control event, and not a disruptive situation, is present according to the two monitoring operations, and in that the sensor controller, in the disruptive situation monitoring, increases a "disruptive indicator" variable, cyclically when a disruptive sign is detected at a respective monitoring time, and in that a disruptive situation is deemed to be detected in the sensor controller when a predetermined threshold value for the disruptive indicator is exceeded.

16. The method as claimed in claim 2, wherein the motor-adjustable closure element comprises a gate.

17. The method as claimed in claim 2, wherein the motor-adjustable closure element comprises a tailgate.

18. The method as claimed in claim 3, wherein the sensor elements are arranged in or on a rear paneling part and extend over a substantial part of the width of the motor vehicle, in that the detection range of one sensor element also points to the rear in any case, and in that the detection range of the other sensor element also points downward in any case.

* * * * *